United States Patent
Valera et al.

(10) Patent No.: US 10,422,934 B2
(45) Date of Patent: Sep. 24, 2019

(54) DIFFRACTION GRATINGS AND THE MANUFACTURE THEREOF

(71) Applicant: BAE SYSTEMS plc, London (GB)

(72) Inventors: Mohmed Salim Valera, Rochester-Kent (GB); James Raymond Leighton, Rochester-Kent (GB)

(73) Assignee: BAE SYSTEMS plc, London (GB)

( * ) Notice: Subject to any disclaimer, the term of this patent is extended or adjusted under 35 U.S.C. 154(b) by 5 days.

(21) Appl. No.: 14/653,618

(22) PCT Filed: Jan. 6, 2014

(86) PCT No.: PCT/GB2014/050019
§ 371 (c)(1),
(2) Date: Jun. 18, 2015

(87) PCT Pub. No.: WO2014/108670
PCT Pub. Date: Jul. 17, 2014

(65) Prior Publication Data
US 2015/0355394 A1 Dec. 10, 2015

(30) Foreign Application Priority Data

Jan. 8, 2013 (EP) .................................... 13275003
Jan. 8, 2013 (GB) .................................... 1300239.9

(51) Int. Cl.
*G02B 5/18* (2006.01)

(52) U.S. Cl.
CPC ......... *G02B 5/1866* (2013.01); *G02B 5/1828* (2013.01); *G02B 5/1857* (2013.01)

(58) Field of Classification Search
CPC ...... G02B 5/18; G02B 5/1819; G02B 5/1823; G02B 5/1828; G02B 5/1857; G02B 5/1861; G02B 5/1866; G02B 5/1876; G02B 27/0037; G02B 27/0056
USPC ........ 359/569, 573, 575, 571, 1, 3–8, 15, 16
See application file for complete search history.

(56) References Cited

U.S. PATENT DOCUMENTS

| 3,980,883 | A | * | 9/1976 | Franks ..................... G21K 1/06 378/145 |
| 4,798,446 | A | | 1/1989 | Hettrick |
| 5,279,924 | A | | 1/1994 | Sakai et al. |
| 5,283,690 | A | | 2/1994 | Miyake et al. |
| 2002/0076154 | A1 | | 6/2002 | Maisenhoelder et al. |

(Continued)

FOREIGN PATENT DOCUMENTS

| EP | 2533077 A1 | 12/2012 |
| WO | 2014108670 A1 | 7/2014 |

OTHER PUBLICATIONS

International Preliminary Report on Patentability received for Patent Application No. PCT/GB2014/050019, dated Jul. 23, 2015. 7 pages.

(Continued)

*Primary Examiner* — Marin Pichler
(74) *Attorney, Agent, or Firm* — Finch & Maloney PLLC

(57) ABSTRACT

A diffraction grating 1 includes a surface 12 having grooves 14 therein, each groove 14 providing a diffracting surface for light incident upon the diffracting surface. The grooves 14 are separated from each other by lands 20 upon the surface 12. The lands 20 are of predetermined varying width, whereby the diffractive efficiency of the grating 1 varies across the extent of the grating 1.

12 Claims, 2 Drawing Sheets

(56) References Cited

U.S. PATENT DOCUMENTS

2004/0156299 A1\* 8/2004 Sakai .................. G11B 7/0901
369/112.1
2005/0146720 A1\* 7/2005 Hansen ................ G02B 5/3058
356/370
2008/0259456 A1\* 10/2008 Schilling ................ B44F 7/00
359/571

OTHER PUBLICATIONS

International Search Report and Written Opinion received for Patent Application No. PCT/GB2014/050019, dated Feb. 4, 2014. 10 pages.

GB Intellectual Property Office Search Report under Section 17(5) received for GB Patent Application No. 1300239.9 dated May 1, 2013. 3 pages.

EP Intellectual Property Office Extended Search Report received for EP Patent Application No. 13275003.5 dated Apr. 5, 2013. 6 pages.

\* cited by examiner

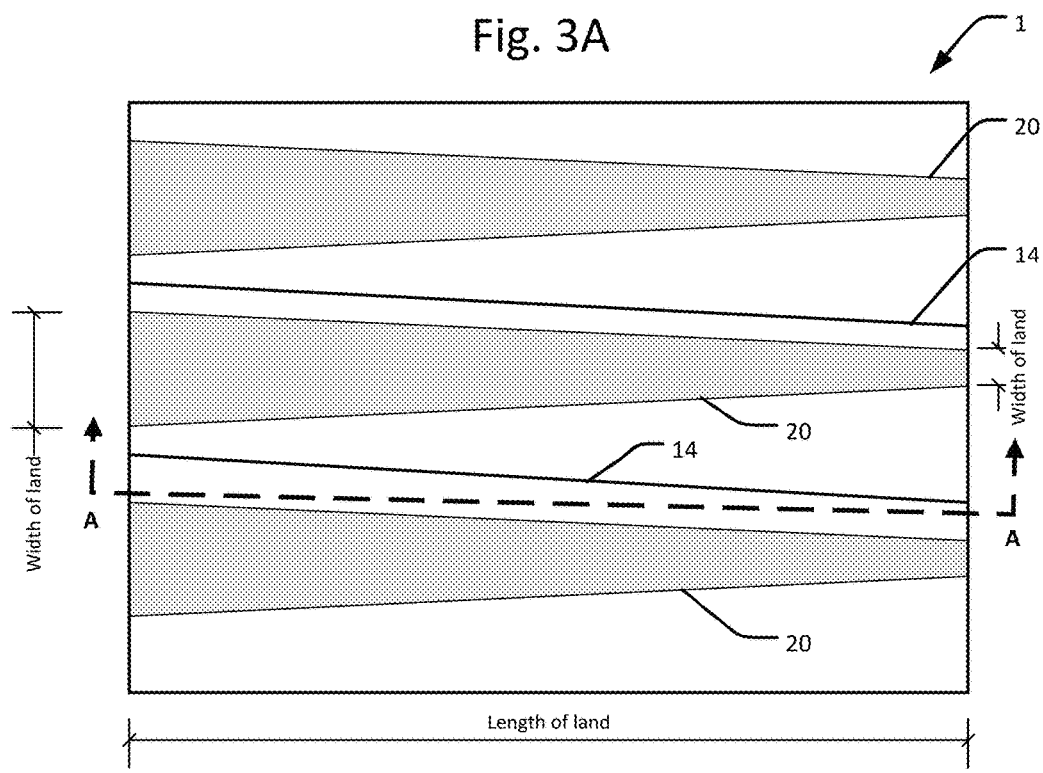
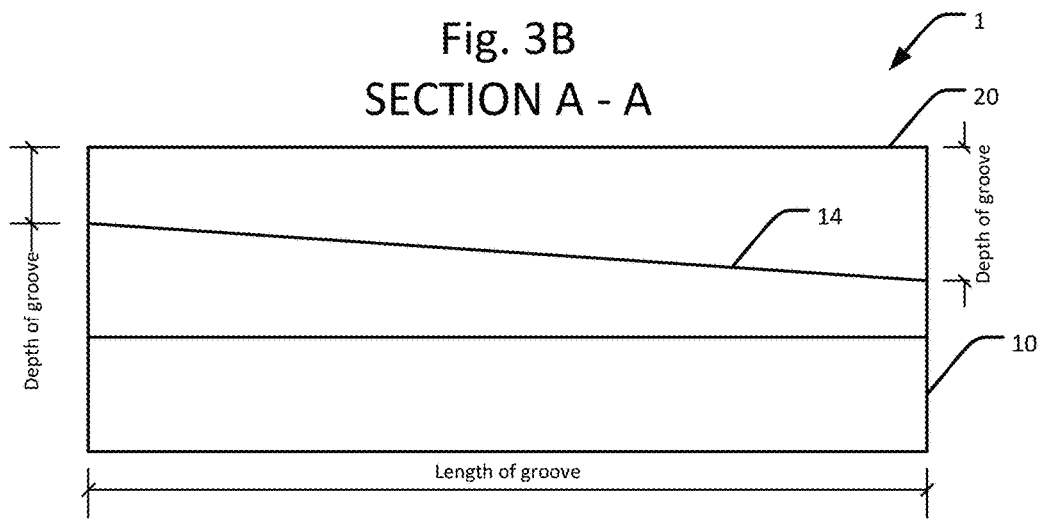

DIFFRACTION GRATINGS AND THE MANUFACTURE THEREOF

This invention relates to diffraction gratings and to the manufacture thereof.

It sometimes is desirable that the efficiency of a diffraction grating should vary across its extent, so that the diffraction grating provides a differing effect in different regions of its surface. Usually this is achieved by controlling the thickness or other property of an optical coating applied to the surface of the grating. The degree of variation obtainable however may not to enough, or it may be insufficiently precise. At least in some embodiments the present invention can provide a variable-efficiency diffraction grating in which these problems are mitigated. The invention also provides a method of making the master gratings from which the diffraction gratings of the invention are replicated.

In one aspect the invention provides a diffraction grating comprising a surface having grooves therein, each groove having a diffracting surface, the grooves being separated from each other by lands of the first-mentioned surface of predetermined varying width, whereby the diffractive efficiency of the grating varies across the extent of the grating.

The grating may comprise blazed grooves in a surface, the grooves being separated by unblazed lands of the surface of predetermined varying width.

The diffracting surfaces of the grooves may be disposed non-orthogonally to the first-mentioned surface.

In particular, the grating may be a blazed grating.

Thus, another aspect the invention provides a blazed diffraction grating comprising grooves in a surface, the grooves being separated by un-blazed lands of said surface of predetermined varying width.

The lands may vary in width from groove to groove. By this we do not mean that each land is necessarily of different width to its immediate neighbours, although such a construction is within the invention. We also contemplate within this statement that groups of adjacent lands may have the same width, but this width may be different to that of a land or group of lands elsewhere on the grating.

Alternatively or in addition a land may vary in width along its length.

For a groove which tapers from top to bottom, for example a triangular groove of a blazed grating, the depth of the groove will be a function of its width. Thus, for grooves of constant pitch, increasing the width of the intervening lands decreases the width of the grooves and thus their depth. The efficiency of a grating with such grooves is a function of the groove depth, and so the local efficiency of a grating can be established by controlling the width of the groove-separating lands during manufacture of the grating. For gratings manufactured by replication this may be done by controlling the land width in the master grating.

In this specification, the width of a groove or land is its dimension measured in the direction of successive pitches of the grating. The length of the groove or land is its longitudinal dimension locally orthogonal to the pitch dimension. The depth of a groove is its dimension into the surface in which it is defined.

It will be appreciated from the foregoing that the depth of the groove may vary from groove to groove. Alternatively or in addition, a groove may vary in depth along its length.

It also will be appreciated that the width of a land or land may be varied so that the pitch of the grooves may be varied across the extent of the grating. By this means it is possible, in addition or alternatively to varying the local efficiency of the grating, to introduce optical power into the grating for example to correct for angular distortion in an image transmitted or reflected by the grating.

The invention also provides a master grating and/or replicator mould arranged to produce a grating as set forth above.

The invention further provides a method of manufacturing such a master grating, comprising forming on a surface of a substrate a mask defining lands of varying width and removing unmasked material from the substrate to form grooves. When the substrate comprises a crystal, the method may comprising forming said surface of the substrate at an angle relative to a crystal plane of the substrate such that removal of the unmasked material is effected preferentially parallel to the crystal plane.

The unmasked material may be removed by anisotropic wet etching.

The invention will be described, merely by way of example only, with reference to the accompanying drawings, wherein:

FIGS. 3A and 3B are plan and elevation views of a diffraction grating according to the invention.

Figure 1:
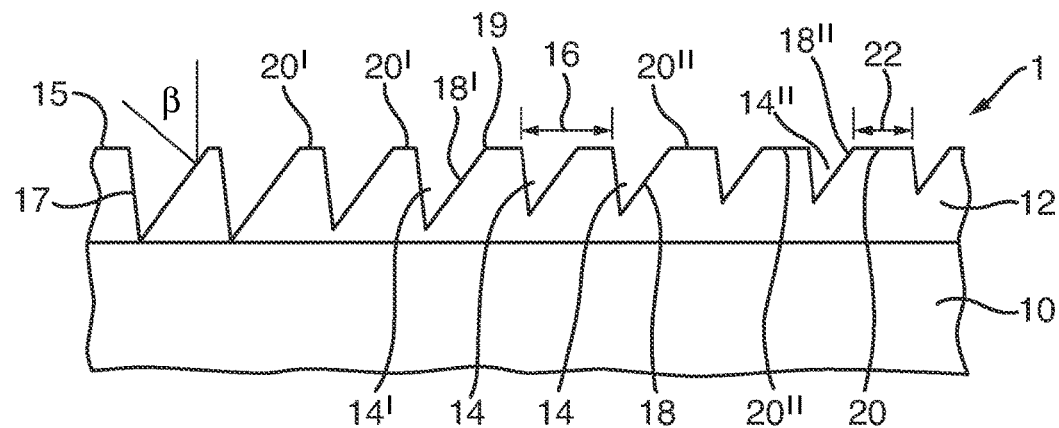
FIG. 1 is a section through a diffraction grating according to the invention.

Referring to FIG. 1, a diffraction grating 1 comprises a glass substrate 10 on which there is a polymer layer 12. The layer 12 has impressed therein a series of grooves 14 in its top surface 15, the distance or pitch 16 between grooves 14 being such that the grooves 14 diffract a portion of the light incident thereon.

The performance of a grating 1 in which the grooves 14 are immediately adjacent each other is governed by the diffraction grating equation:

$$d(\sin \theta m + \sin \theta i) = m\lambda$$

Where d is the grating pitch, $\theta i$ is the angle of incidence of the light on the grating, $\theta m$ is the angle at which the light is diffracted relative to a normal to the grating, $\lambda$ is the wavelength of the light and m is an integer, which may be positive, negative or zero.

Generally, a grating 1 is configured so as to operate at a preferred order of diffraction e.g. m=1, 2 or −1, −2.

When m=0 or "zero order" the light is either transmitted though the grating 1 without diffraction or, in the case of a reflective grating, specularly reflected from the grating 1.

The efficiency of the grating is the proportion of the incident light which is diffracted in the demand order (or orders, if the grating is to operate as a multiple order grating).

In this embodiment, the grating 1 of FIG. 1 is a blazed grating i.e. one which is configured to have optimum efficiency for monochromatic light of a particular wavelength and at a particular range of incident angles. Thus the grooves 14 have operative blazed surfaces 18 which are inclined to the surface 15 of the layer 12 so that they are perpendicular to the blaze angle β. This angle is chosen so that the grating 1 is most efficient at the operational wavelength and range of incident angles. The grooves 14 as illustrated are triangular in shape, and are formed by three facets: a blaze surface 18, a land surface 20 and a anti-blaze surface 17. It is usually required that blazed gratings diffract most efficiently in either the positive or negative orders. For this to happen, the anti-blaze facet 17 should be as perpendicular to the surface 15 as possible. The manufacturing process used to create a grating 1, which includes but is not limited to replication and coating, may dictate that the angle of the anti-blaze facet 17 deviates from perpendicular to the surface 15.

As noted, the grooves 14 are of constant pitch 16. More specifically, their trailing edges 19 formed by the intersections of the blazed surfaces 18 with the surface 15 of the layer 12 are at constant pitch. However, according to the invention, the grooves are separated by lands 20 of predetermined width 22 which is chosen so as to vary from land to land. The geometry of the grooves 14 is constant, and consequently the depth of each groove 14 is determined by the width of its immediately-preceding land. Thus it can be seen that groove 14' is preceded by a relatively narrow land 20' and thus is relatively deep. In contrast, groove 14" is preceded by a relatively wide land 20" and thus is relatively shallow.

This variation in land width and groove depth results in the diffraction efficiency of the grating 1 being different at different points on its surface 15. Thus most of the light incident on the area defined by the land 20' and groove 14' will be received by the inclined blazed surface 18' and is diffracted into the desired order. Only the relatively small proportion of the incident light which is received by the land 20' is transmitted or reflected in the zero order, and thus the efficiency of this area of the grating 1 is relatively high. On the other hand, light incident on the area defined by the land 20" and groove 14" will be received mostly by the land 20", and only a relatively small proportion by the blazed surface 18" of the groove 14". Thus the efficiency of this area of the grating 1 will be relatively low.

In this particular embodiment pairs of adjacent lands e.g. 20' or 20" are shown to be of the same width, that width being different to the width of adjacent pairs of lands. Other patterns are of course possible: for example if each land 20 is of different width to its neighbours a more evenly graded variation in efficiency across the surface of the grating 1 can be obtained. Alternatively, if substantial numbers of adjacent lands 20 in one area of the grating 1 are of the same width, and substantial numbers of adjacent lands 20 in another area of the grating 1 have a different width, then a grating 1 with well-defined areas of different efficiency can be obtained. Indeed, if required a step-change between areas of marked by different efficiency can be achieved.

As noted, FIG. 1 is a section through the grating. The width of the lands 20 and the depth of the grooves 14 may also vary along their length, i.e. into or out of the plane of the figure. This enables the efficiency of for example the area 14", 20" and/or 14', 20' to be varied orthogonally to the variation from groove to groove. FIGS. 3A and 3B show a plan view and an elevation sectional view, respectively, of an example diffraction grating 1 having varied width lands 20 and varied depth grooves 14.

The variation in land width normally is effected during manufacture by maintaining the position of each intersection 19 between a blazed surface 18 and land 20 constant, and varying the land width away from it. Thereby the pitch 16 of the blazed surface edges 19 is held constant and the variation in groove depth is achieved.

It will be appreciated that the pitch 16 of the grooves 14 may also be varied, if it is required for example to give the grating 1 optical power so that it operates also as a lens or non-planar mirror. This can enable errors in an image carried by the incident light to be corrected. When designing a grating 1 having both varying pitch 16 and varying land 20 width, the pitch 16 variation is set by adjusting the distance between successive edges 19, and the land 20 width is then set from the adjusted edges 19. Thus the efficiency variation is effectively superimposed on the pitch variations.

Whilst the diffraction grating 1 has been described as planar, the invention may also be applied to diffraction gratings defined on curved surfaces.

Figure 2:
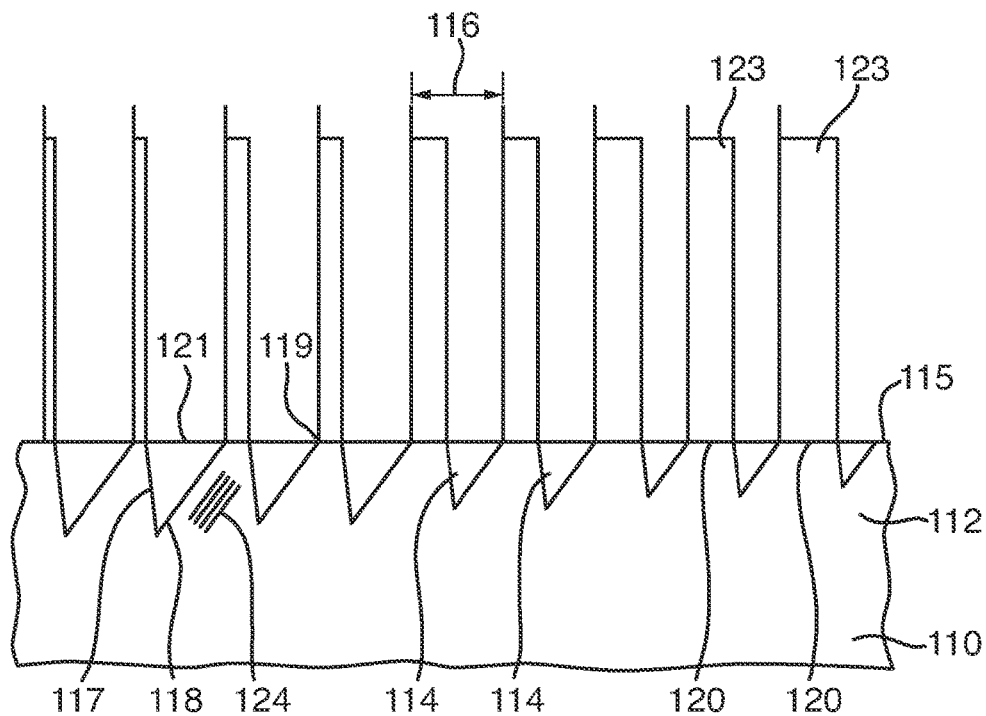
FIG. 2 illustrates the manufacture of a master grating according to the invention.

FIG. 2 illustrates manufacture of a master grating 110 for the replication of the diffraction grating 1 of FIG. 1.

The master grating 110 comprises a crystal of silicon 112 disposed on a suitable substrate, not shown. When manufactured, the crystal has cut into its surface 115 grooves 114 of shape and pitch identical to those of the eventual grating 1, subject only to adjustments as will be familiar to those skilled in the art to allow for coatings which may be applied, and for dimensional changes which may arise during the replication process.

To cut the grooves 114, the initially-planar surface 115 is provided with an etch-resistant mask by a known method. Thus the surface 115 is coated with a film of a negative electron-beam resist 121 e.g. ZEP-520 (from "Zeon Corporation", Japan) or AR-N7700 (from "Allresist", Germany). This film is then traversed by a scanning electron beam 123 to expose the resist and forms a mask defining the lands 120. The width of the scanning pattern is varied so that the required variation in land 120 width is reproduced in the mask. The unexposed portions of the resist film 121 are then removed, and the thus-revealed portions of the surface 115 are subjected to anisotropic wet etching. To facilitate accurate and efficient etching the orientation of the silicon crystal 112, shown symbolically at 124, is chosen so that the blazed surfaces 118 lie parallel to a selected crystal plane of the silicon whereby the etch rate parallel to the crystal plane is much faster than the etch rate perpendicular to the crystal plane, thus defining the blazed surfaces 118 at the correct angle.

Other known techniques may be used to provide the grooves 114, for example ion beam milling, but this may not yield smooth crystalline surfaces, and the process may not control the blaze length and depth to the same degree as is obtainable by anisotropic wet etching of a suitably oriented crystal 112 as described above.

The master grating 110 may be used to produce one or more replication moulds ("stampers") by known techniques, and the stampers in turn then used to produce diffraction gratings 1.

A diffraction grating 1 includes a surface 12 having grooves 14 therein, each groove 14 is arranged to provide a diffracting surface for light incident upon the diffracting surface. The grooves 14 are separated from each other by lands 20 upon the surface 12. The lands 20 are of predetermined varying width, whereby the diffractive efficiency of the grating 1 varies across the extent or surface of the grating 1.

The invention claimed is:

1. A diffraction grating comprising:
   a substrate having a plurality of blazed grooves impressed in a first surface of the substrate, each of the blazed grooves separated from each other by lands of the first surface and by a constant pitch distance, each of the blazed grooves having a varied depth relative to the first surface, the depth of each blazed groove being varied along a length thereof and further defined by an adjacent land surface of the first surface of the substrate, the adjacent land surface having a width that varies along a length thereof,
   a blaze surface inclined with respect to the adjacent land surface, and an anti-blaze surface approximately perpendicular to the adjacent land surface wherein the pitch distance between adjacent grooves is constant along the length of the groove.

2. The grating of claim 1, wherein the diffracting surfaces of the grooves are non-orthogonal to the first surface.

3. The grating of claim 1, wherein the width of the lands varies in a pitch direction of the blazed grooves.

4. The grating of claim 1, wherein the depth of the blazed grooves varies in a pitch direction of the blazed grooves.

5. The grating of claim 1, wherein the depth of at least one of the blazed grooves varies along a length of the grating.

6. The grating of claim 1 wherein:
the diffracting surfaces of the blazed grooves are non-orthogonal to the first surface of the layer; and
the width of the lands varies in a pitch direction of the blazed grooves.

7. The grating of claim 1 wherein:
the diffracting surfaces of the blazed grooves are non-orthogonal to the first surface of the layer; and
the pitch of the blazed grooves varies in a pitch direction of the grooves.

8. The grating of claim 1, wherein a first land is one of a first pair of lands having a first width, wherein a second land is one of a second pair of lands having a second width, and wherein a third land is one of a third pair of lands having a third width.

9. The grating of claim 8, wherein the first pair of lands are directly adjacent to the second pair of lands, and wherein the third pair of lands are directly adjacent to the second pair of lands.

10. A method of manufacturing a diffraction grating comprising a layer on a substrate, the layer having a plurality of blazed grooves impressed in a first surface of the layer, each of the blazed grooves having a diffracting surface and an anti-blaze surface, each of the blazed grooves being separated from each other by lands of the first surface, the lands being defined by the blazed grooves and having predetermined varying width, the diffractive efficiency of the grating varying across the first surface, wherein the diffracting surface is inclined with respect to the first surface, and wherein the anti-blaze surface is approximately perpendicular with respect to the first surface, the method comprising:

forming, on the first surface, a mask defining the lands of the varying width, and removing unmasked material from the substrate to define the grooves, wherein each of the blazed grooves has a varied depth relative to the first surface, the depth of each blazed groove being variable along a length thereof and further defined by a width of a land of the first surface adjacent to the respective groove, wherein the width of the adjacent land varies along a length thereof, and wherein the pitch distance between adjacent grooves is constant along the axial length of the groove.

11. The method of claim 10, wherein the substrate comprises a crystal having a crystal plane at an angle relative to the substrate such that the removing of the unmasked material is effected preferentially parallel to the crystal plane.

12. The method of claim 11, wherein the removing of the unmasked material is performed by anisotropic wet etching.

* * * * *